United States Patent [19]

Wipf

[11] Patent Number: 5,052,542
[45] Date of Patent: Oct. 1, 1991

[54] SINGLE-ITEM DISTRIBUTOR

[75] Inventor: Alfred Wipf, Jestetten, Fed. Rep. of Germany

[73] Assignee: Sig Schweizerische Industrie-Gesellschaft, Neuhausen am Rheinfall, Switzerland

[21] Appl. No.: 481,593

[22] Filed: Feb. 20, 1990

[30] Foreign Application Priority Data

Feb. 20, 1989 [CH] Switzerland .............. 606/89

[51] Int. Cl.$^5$ .............................................. B65G 37/00
[52] U.S. Cl. .................................... 198/372; 198/441; 198/479.1
[58] Field of Search ............... 198/367, 440, 441, 456, 198/457, 362, 366, 722, 726, 479.1, 372, 371, 502.2, 461, 817

[56] References Cited

U.S. PATENT DOCUMENTS

| 2,049,112 | 7/1936 | Fenton | 198/817 X |
| 2,957,572 | 10/1960 | Dvorak | 198/817 X |
| 2,981,410 | 4/1961 | Perrelli | 198/440 X |
| 3,071,239 | 1/1963 | Burtness | 198/371 X |
| 3,246,733 | 4/1966 | Torbet et al. | 198/372 |
| 3,363,741 | 1/1968 | Dierksheide | 198/457 X |
| 3,515,254 | 6/1970 | Gary | 198/502.2 |
| 3,701,407 | 10/1972 | Kulig | 198/457 |
| 4,057,138 | 11/1977 | Grebe | 198/372 |
| 4,216,854 | 8/1980 | McCoy | 198/479.1 |
| 4,356,908 | 11/1982 | Embro, Jr. | 198/461 |
| 4,635,786 | 1/1987 | Renda | 198/461 X |
| 4,682,684 | 7/1987 | Löthman | 198/461 |
| 4,765,940 | 8/1988 | Circelli et al. | 198/457 X |
| 4,771,877 | 9/1988 | Langen | 198/461 |
| 4,832,178 | 5/1989 | Anderson et al. | 198/461 |

FOREIGN PATENT DOCUMENTS

| 123451 | 6/1931 | Austria. | |
| 2551538 | 5/1977 | Fed. Rep. of Germany. | |
| 914140 | 9/1946 | France | 198/372 |
| 156226 | 6/1989 | Japan | 198/372 |

Primary Examiner—Robert P. Olszewski
Assistant Examiner—Cheryl L. Gastineau
Attorney, Agent, or Firm—Spencer & Frank

[57] ABSTRACT

An item transfer apparatus has a first conveyor for advancing items thereon in a first advancing direction; a second conveyor for advancing items thereon in a second advancing direction; and a rotatable transfer device having a rotary axis and a pushing member arranged for motion across the first conveyor for displacing items from the first conveyor to the second conveyor. The rotary axis lies in a plane oriented parallel to the conveying plane of the first conveyor.

6 Claims, 4 Drawing Sheets 5,052,542

SINGLE-ITEM DISTRIBUTOR

CROSS REFERENCE TO RELATED APPLICATION

This application claims the priority of Swiss Application No. 606/89-5 filed Feb. 20th, 1989, which is incorporated herein by reference.

BACKGROUND OF THE INVENTION

This invention relates to a device for distributing single items and is of the type which has a rotary transfer device for transferring the individual items from a first conveyor track (on which they are advanced in a flat-lying state) to a second conveyor track.

German Offenlegungsschrift (application published without examination) 2,551,538 discloses an apparatus for advancing individual items and inserting them into pockets of a conveyor chain forming part of a cardboard boxing machine. For this purpose a transfer device is provided which has a plurality of suction carriages which are arranged about a central shaft by means of radial arms. Each suction carriage is provided with a suction head to receive the individual item and with a valve member for controlling the vacuum stream. The valve member is actuated by the individual item to be received so that flow of the vacuum stream is initiated and the individual item is held firmly by the suction head. To ensure that the individual items situated on the conveyor belt of the supply track preserve their position during transfer onto the conveyor belt of the output (receiving) track, the suction heads are rotatable through 90°.

While the known transfer device whose central axis is oriented perpendicularly to the two conveyor belts, may perform a satisfactory transfer of the individual items from a production machine to a cardboard boxing machine, it is excessively complex as concerns the suction heads which are mounted for rotation through 90° and which operate with vacuum.

SUMMARY OF THE INVENTION

It is an object of the invention to provide an improved apparatus of the above-outlined type which has a simplified transfer device.

This object and others to become apparent as the specification progresses, are accomplished by the invention, according to which, briefly stated, the axis of rotation of the transfer device is oriented in a plane which is parallel to the conveyor track which supplies items to the transfer device.

By virtue of the particular structure of the distributor and particularly the transfer device whose central axis is, contrary to prior art structures, not perpendicular to the supply conveyor track and the output conveyor track, but is oriented parallel to the supply conveyor track, a significant simplification of the transfer device is achieved.

DESCRIPTION OF THE PREFERRED EMBODIMENTS

Figure 1:
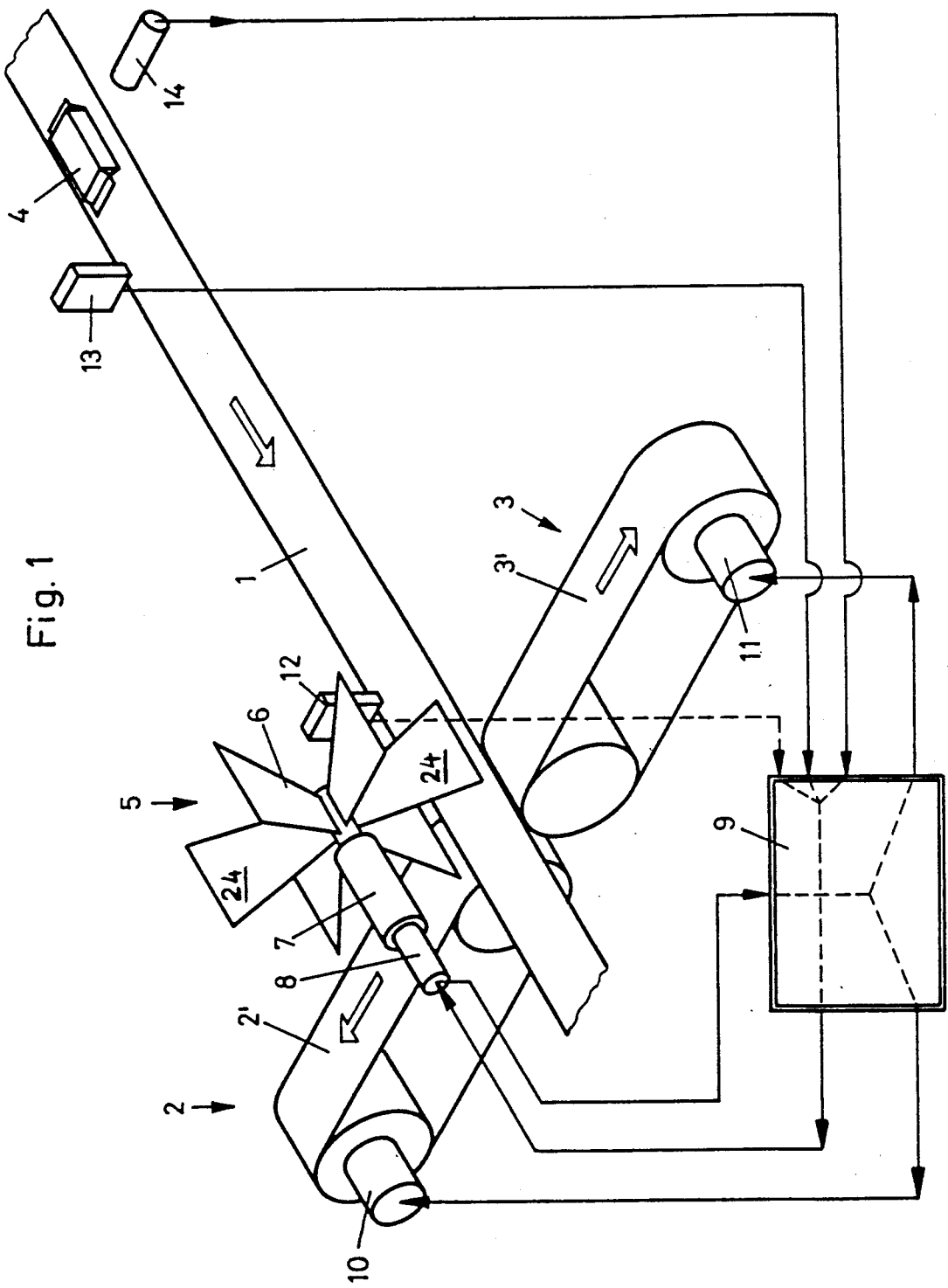
FIG. 1 is a schematic perspective view of a preferred embodiment of the invention.

Turning to FIG. 1, the single-item distributing apparatus shown therein has an input or supply conveyor track 1 which is travelling between two longitudinally aligned output conveyor belts 2 and 3 having at least approximately coplanar conveyor tracks 2' and 3', respectively. On the conveyor track 1 there is disposed an individual item 4 such as a wrapped chocolate bar. In the zone above adjoining ends of the two conveyor belts 2 and 3 there is arranged a transfer device 5 which comprises a winged wheel 6, a servomotor 7 and an encoder 8 which is connected to a processor or computer 9 that also applies signals to a servomotor 10 of the conveyor 2 and a servomotor 11 of the conveyor 3. A sensor 12 is situated immediately upstream of the transfer device 5, as viewed in the direction of motion of the conveyor track 1. Preferably about two item lengths upstream of the sensor 12 a second sensor 13 is arranged. The processor 9 is connected to the sensors 12 and 13 as well as to a further encoder 14 which is synchronized with the conveyor 1. The sensors 12 and 13 may be optical barriers.

Figure 2:
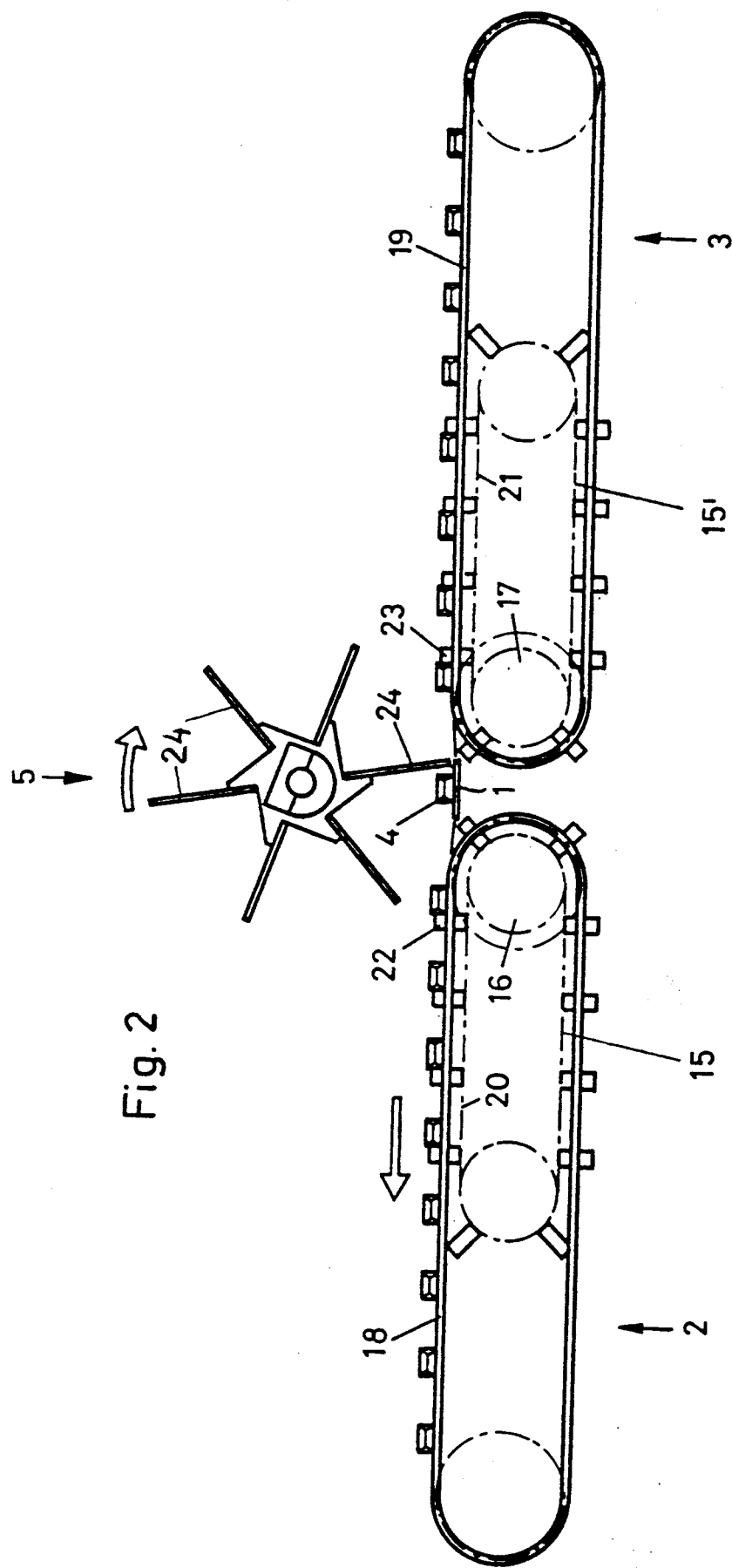
FIG. 2 is a schematic side elevational view of the preferred embodiment.

Turning now to FIG. 2, the conveyors 2 and 3 are associated with respective auxiliary conveyors 15, 15'. The conveyor 2 and the auxiliary conveyor 15 have a common end roller 16 which has four circumferential grooves, two of which have an inner diameter D while the other two have a smaller inner diameter d. The roller 17 supporting the conveyors 3 and 15' is similarly structured. The conveyors 2 and/or 3 have no conveyor belts but comprise two parallel-running, cross-sectionally circular belts 18 and 19 (only one such belt is visible for each conveyor). The belts 18 and 19 are received in the roller grooves having the larger diameter D. The auxiliary conveyors 15, 15', on the other hand, may each have two chain belts that run in the roller grooves of diameter d and of which only one chain belt 20 and 21 is visible in FIG. 2. The chain belts are provided with holding members 22 and 23, respectively which are distributed preferably at uniform distances along the chain belt. The three rollers supporting the endless belt pair 18, 18' and the auxiliary conveyor 15 and/or the three rollers supporting the endless belt pair 19, 19' and the auxiliary conveyor 15' have rotary axes that are parallel-spaced and lie in a single plane. The transfer device 5 shown in FIG. 3 has a winged wheel formed of six wings 24. The edge of one of the wings 24 is situated in the vicinity of the item 4 supported on the conveyor track 1.

Figure 3:
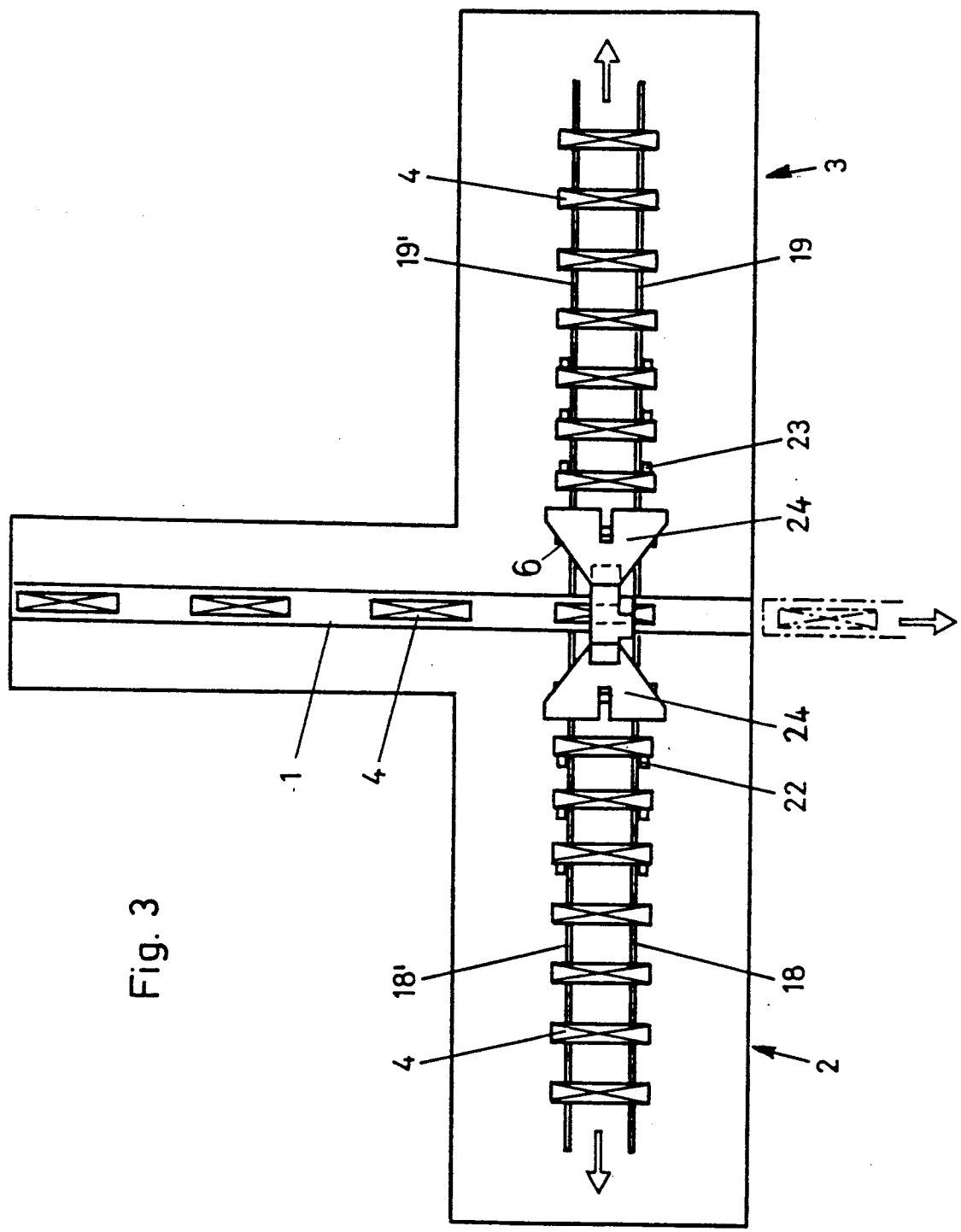
FIG. 3 is a top plan view of the construction shown in FIG. 2.

In FIG. 3, the two cross-sectionally circular belt pairs 18, 18' and 19, 19' of the conveyor 2 and 3, respectively, are shown, for the sake of simplicity, without chain belts and only a few of the holding elements 22, 23 are illustrated. The holding elements 22, 23 are situated externally of the area bounded by the cross-sectionally circular belts 18, 18' and 19, 19'. By contrast, the holding elements 22 and 23 according to FIG. 2 are situated within the above-noted area to show that both embodiments are feasible and further, instead of cross-sectionally circular belts or sprocket (chain) belts it is possible to use cross-sectionally V-shaped or flat belts. In FIG. 3 a plurality of individual items 4 is shown on the conveyor belt 1 and on the belt pairs 18, 18' and 19, 19'. For the sake of clarity, only two wings 24 of the winged transfer wheel 6 are shown.

Figure 4:
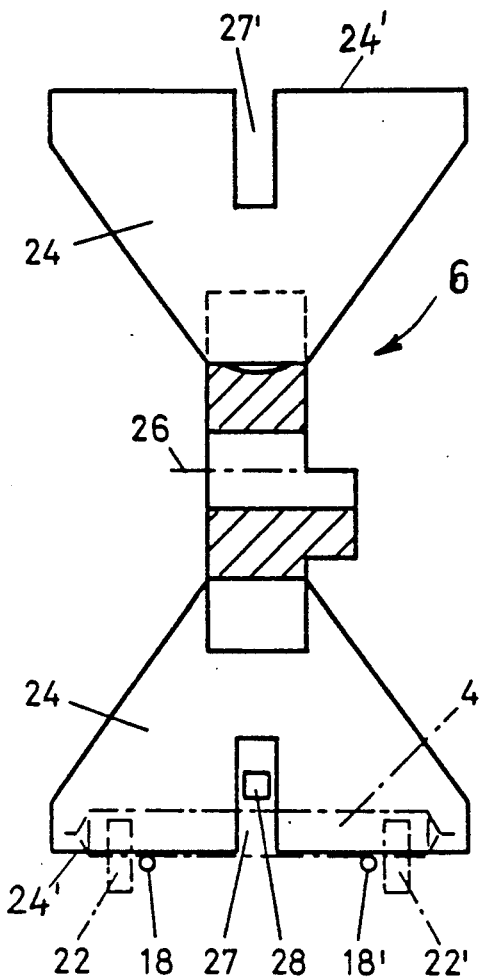
FIG. 4 is a sectional view of a component of FIG. 3, shown on an enlarged scale.

As seen in FIG. 4, the distance between the axis 26 of the winged wheel 6 and the outer edge 24' of the wings 24 is slightly less than the distance between the axis 26 and the conveying plane defined by the cross-sectionally circular belts 18, 18' on which the individual items 4 are disposed. As illustrated in FIG. 4, the holding members 22, 22' are situated externally of the area bounded by the cross-sectionally circular belts 18, 18'. Each wing 24 has a centrally extending slot 27 to provide a free space for a linear or partially arcuate guide bar (item protecting bar) 28 which is oriented perpendicularly to the axis 26 and extends slightly above the individual items 4. For simplifying the drawing, the guide bar 28 is not illustrated in FIGS. 1, 2 and 3.

In the description which follows, the operation of the construction illustrated in FIGS. 1-4 will be described.

At the outset it is noted that the distributing apparatus may operate with a sole conveyor 2 or 3 and further, for certain applications the sensor 12 may be omitted and also, the winged wheel 6 has at least two wings or a single wing with a counterweight.

By virtue of the signals delivered by the encoder 14 to the processor 9, the latter is capable of determining the position of a reference point of the conveyor 1 in each moment. With the aid of the signals delivered by the sensor 13 the processor 9 may determine the moment when the frontal edge of an individual item 4 just passes the sensor 13. Based on these data the processor 9 delivers signals to the encoder 8 which controls the servomotor 7 in such a manner that one wing 24 of the wheel 6 of the transfer apparatus 5 sweeps transversely across the conveyor track 1 at the precise moment when an item 4, travelling on track 1, is situated in a centered position relative to the conveyor 2'. As a result, the item 4 is pushed by the wing 24 onto the conveyor 2' and is retained thereon by the travelling holding members 22. The processor 9 also controls the servomotor 10 such that the items 4 arrive in a predetermined cadence or in predetermined distances onto the conveyor 2'. The sensor 12 serves for determining the position of the items 4 on the supply conveyor 1. If, after energization of the distributor apparatus there are situated, between the two sensors 12 and 13 items, whose position is unknown, these items are detected by the sensor 12 and are thereafter pushed, for example, onto the conveyor 3' by rotating the winged wheel 6 in the opposite direction.

The processor 9 may perform a software shift register function in a manner now to be described.

As soon as the sensor 13 detects the presence of a leading portion of an item, a "1" is recorded in the register and is briefly displayed. Its address is retained in an address-memory counter is erased. For each pulse from the encoder 14 the counter is increased by "1" and reader and writer are shifted one address. If the sensor 13 again detects the leading end of an article, the counter content is stored in that address which is found in the address-memory and the new shift address is retained in the address-memory and the counter is erased. The reader thus reads, according to a shift register length, the values which the writer has written in. If the reader reads a "0" nothing is undertaken. If the reader reads a number greater than "1" then such a reading is interpreted as a distance between two articles from which a transmission ratio for the electronic drive has to be calculated. If the reader reads a "1" this means that still no new article has passed the sensor 13. In such a case the transfer apparatus runs with a speed in which one revolution corresponds to the average distance between two articles. The corresponding value is subtracted by the counter and is added to the address in the address memory. The "1" in the shift register is now stored at this new address in the shift register. It is to be noted in this connection that the winged wheel should rotate continuously, that is, its speed should not be reduced to zero.

The distributing device may have, for example, three proximity switches which are needed for the positioning of the motors for energization or resetting.

Figure 5:
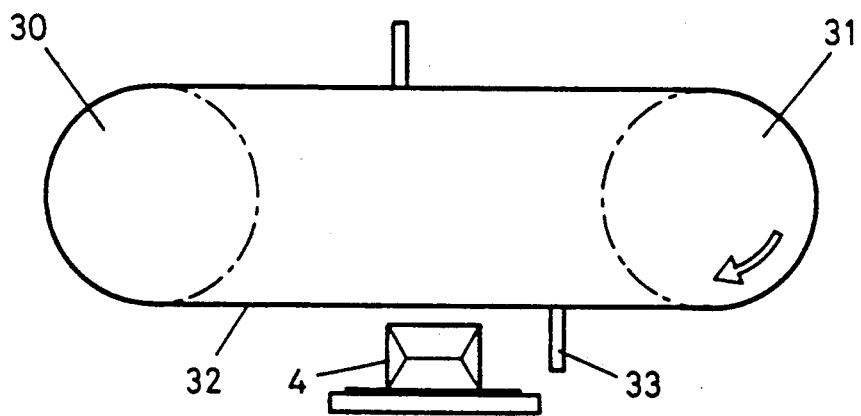
FIG. 5 is a schematic side elevational view of still another preferred embodiment of the invention.

The transfer apparatus illustrated in FIG. 5 has an open belt drive including two end rollers 30, 31 and a belt 32 which is provided with at least one pusher pin 33. The belt drive is arranged transversely to the conveyor 1 preferably in such a manner that the axes of the rollers 30 and 31 are oriented parallel to the conveyor 1. The belt drive operates such that in a predetermined moment the pin 33 pushes the item 4 from the middle of the conveyor 1 onto the conveyor 2' or 3'.

The distributor according to the invention may cooperate not only with a single one of the conveyors 2 and 3 but may equally divide the items between the two conveyors 2, 3.

The distributor device may also perform an article accumulating function by maintaining the conveyor 1 stationary and providing that the items which are situated on one of the conveyors 2' or 3' are shifted over the stationary conveyor 1 onto the other conveyor 3' or 2', respectively. The distributing device is reversible, that is, the conveyor 1 may function not only as a supply conveyor but also as the output conveyor.

It will be understood that the above description of the present invention is susceptible to various modifications, changes and adaptations, and the same are intended to be comprehended within the meaning and range of equivalents of the appended claims.

What is claimed is:

1. An item transfer apparatus comprising
   (a) a first conveyor means for advancing items thereon in a first advancing direction; said first conveyor means having a conveying plane;
   (b) a second conveyor means for advancing items thereon in a second advancing direction;
   (c) a rotatable transfer device having a rotary axis and a push member arranged for motion across the first conveyor means for displacing items from the first conveyor means to the second conveyor means; said rotary axis lying in a plane oriented parallel to said conveying plane;
   (d) a third conveyor means being generally in alignment with said second conveyor means; said second and third conveyor means being disposed on opposite sides of said first conveyor means, whereby items are transferred from the first conveyor means to the second conveyor means or the third conveyor means, dependent on a direction of rotation of said rotatable transfer device; at least one of said second and third conveyor means comprising two parallel-extending endless belts; and
   (e) an auxiliary conveyor forming a part of at least one of said second and third conveyor means; said auxiliary conveyor including an auxiliary endless belt and item holding elements attached to said auxiliary endless belt.

2. An item transfer apparatus according to claim 1, wherein said rotary axis is oriented perpendicularly to said second advancing direction.

3. An item transfer apparatus according to claim 1, wherein the transfer device comprises an endless belt, two end rollers supporting said endless belt, each end roller having an axis or rotation lying in a plane oriented parallel to said conveying plane; said pusher member comprising an item displacing pin secured to said endless belt.

4. An item transfer apparatus according to claim 1, further comprising first, second and third end rollers; the endless belts of said at least one of said second and third conveyor means are trained about and being supported by said first and second end rollers; said auxiliary endless belt being supported by said first and third end rollers.

5. An item transfer apparatus according to claim 4, wherein said first, second and third end rollers have rotary axes spaced parallel to one another and lying in a common plane; said third end roller being situated between said first and second end rollers.

6. An item transfer apparatus comprising
(a) a first conveyor means for advancing items thereon in a first advancing direction; said first conveyor means having a conveying plane;
(b) a second conveyor means for advancing items thereon in a second advancing direction;
(c) a rotatable transfer device having a rotary axis and a push member arranged for motion across the first conveyor means for displacing items from the first conveyor means to the second conveyor means; said rotary axis lying in a plane oriented parallel to said conveying plane; the transfer device comprising a winged wheel having an axis of rotation coinciding with said rotary axis; said pushing member comprising a radially extending wing forming a part of said wheel; said wing having an outer edge and a slot provided in said wing and extending from said outer edge; and
(d) an item protecting bar extending perpendicularly to said rotary axis; said protecting bar passing through said slot when said wing moves across the first conveyor means.

* * * * *